United States Patent [19]

Seki

[11] 3,840,817

[45] Oct. 8, 1974

[54] PHASE DETECTOR CIRCUIT

[75] Inventor: Kunio Seki, Tokyo, Japan

[73] Assignee: Hitachi, Ltd., Tokyo, Japan

[22] Filed: Oct. 4, 1973

[21] Appl. No.: 403,395

[30] Foreign Application Priority Data

Oct. 4, 1972 Japan .............................. 47-99032

[52] U.S. Cl. ............... 328/133, 307/232, 330/30 D, 328/155

[51] Int. Cl. ........................................... H03b 3/04

[58] Field of Search ........... 328/133, 134, 158, 159, 328/160, 140, 141; 307/232, 233 R; 331/1, 1 A; 330/30 D

[56] References Cited

UNITED STATES PATENTS

| | | | |
|---|---|---|---|
| 3,500,162 | 3/1970 | Dyer | 307/232 X |
| 3,588,710 | 6/1971 | Masters | 328/133 |
| 3,636,460 | 1/1972 | Hart | 328/155 X |
| 3,750,035 | 7/1973 | Crow | 307/233 X |

*Primary Examiner*—John S. Heyman
*Attorney, Agent, or Firm*—Craig & Antonelli

[57] ABSTRACT

A phase detector circuit wherein two input signals are subjected to pulse shaping, the shaped pulses are combined to produce a sum signal and a difference signal, the sum and difference signals are respectively squared to produce DC potentials proportional to the phase difference of the input signals, and the DC potentials are compared by a single type differential amplifier circuit to produce an output voltage corresponding to the phase difference. The phase detector circuit can easily cancel an offset potential, and can be readily put into the form of an integrated semiconductor circuit.

3 Claims, 14 Drawing Figures

PHASE DETECTOR CIRCUIT

BACKGROUND OF THE INVENTION

1. Field of the Invention

The present invention relates to phase detector circuits and more particularly to a phase detector circuit for use in electronic systems, such as a color television receiver and an FM receiver.

2. Description of the Prior Art

In, for example, the chrominance signal demodulator circuit, the ACC circuit and the color killer circuit of a color television receiver, and the demodulator circuit and the phase lock loop oscillation circuit (PPL) of an FM receiver, it is required to establish phase synchronization between two signals or to detect a phase difference between two signals for the purpose of effecting a demodulation of phase-modulated waves. In order to detect the phase difference between two signals and thus provide an output voltage responsive to the phase difference, there have been proposed a variety of phase detector circuits.

FIG. 1 shows an example of a phase lock loop which employs a phase detector circuit 1 receiving a signal A at one input and a signal B at another input. A voltage-controlled oscillator circuit 2 is connected to the output of said phase detector circuit and a filter circuit 3 receives the output of said oscillator circuit 2 and applies the signal B to said phase detector circuit 1. The received input signal A is compared in phase with the oscillation signal B, so as to control the oscillation condition of the voltage-controlled oscillator circuit 2 in accordance with the detected difference between the phase of the respective signals.

FIG. 2(*b*) shows a phase detector circuit employing a full balance type differential amplifier. The circuit has the overall function of producing the product between two input signals. FIG. 2(*a*) illustrates the characteristics of the output voltages $V_1$ and $V_2$ of the phase detector circuit versus the phase difference between the inputs thereto.

Referring to FIGS. 2(*a*) and 2(*b*), $L_1$ and $L_2$ indicate pulse shaping circuits, which can be provided in the form of amplitude limiter circuits, clamping circuits, slicer circuits or the like. The pulse shaping circuits function to shape the input signals A and B into respectively predetermined pulses. A differential amplifier stage of the full balance type consisting of transistors $Q_1 - Q_6$ performs a multiplication of the two input signals A and B, and functions to generate output voltages responsive to the phase difference by the product. The phase detector circuit is designed to function as described below.

When the phase difference between the input signals A and B is 0°, the output voltage $V_1$ assumes the maximum value, while the output voltage $V_2$ assumes the minimum value. On the other hand, when the phase difference between signals A and B is 180°, the output voltage values are reversed, i.e., $V_1$ assumes the minimum value and $V_2$ assumes the maximum value as seen in FIG. 2*a*. When the phase difference is 90°, both the voltages $V_1$ and $V_2$ become equal. An offset potential, however, arises between the output voltages $V_1$ and $V_2$. The phase detector circuit is therefore disadvantageous in that, when the outputs of the pulse shaping circuits are directly coupled to the differential amplifier stage, the output voltages $V_1$ $V_2$ are not equalized even with a phase difference of 90°. In order to improve the functioning of the phase detector in this respect, the outputs of the pulse shaping circuits can be connected to the differential amplifier stage through capacitors and therefore not be directly coupled thereto. This measure, however, leads to the disadvantage that, in the case of forming such a phase detector circuit as an integrated semiconductor circuit, the member of terminals for external connection is increased.

As a further measure, the offset voltage can be canceled in such a way that the outputs of the pulse shaping circuits are directly coupled to the differential amplifier stage using resistances connected to the emitters of the respective transistors $Q_1 - Q_4$ of the differential amplifier stage, so as to establish a balance by the ratios of the resistances. This measure is disadvantageous in that the adjustments of the ratios among the four resistances are very difficult and that the circuit design necessitates much time.

SUMMARY OF THE INVENTION

The present invention has been made in order to eliminate the disadvantages of the prior art and has its object in providing a phase detector circuit which is easily put into the form of an integrated semiconductor circuit device.

Another object of the present invention is to provide a phase detector circuit which gives rise to no offset voltage.

Still another object of the present invention is to provide a phase detector circuit in which fluctuations in predetermined voltages are slight at a phase difference of 90°.

BRIEF DESCRIPTION OF THE DRAWINGS

FIG. 1 is a schematic block diagram of an exemplary system in which the phase detector circuit according to the present invention is applied to a phase lock loop, the figure having been already referred to;

FIGS. 2*a* and 2*b* illustrate a prior art phase detector circuit, the former being a characteristic diagram thereof and the latter being a schematic circuit diagram thereof, both the figures having been already referred to;

PREFERRED EMBODIMENT OF THE INVENTION

Figure 1:
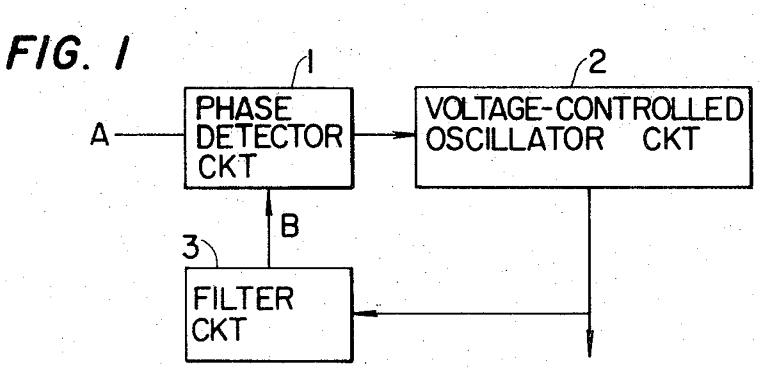
Figure 2A:
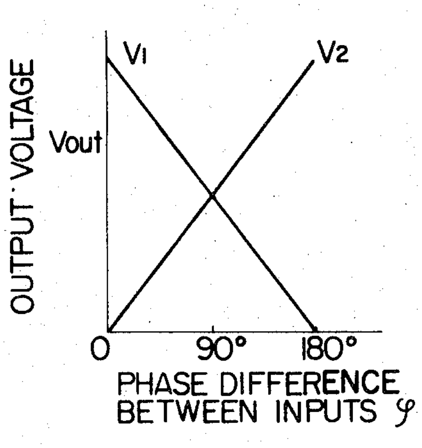
Figure 2B:
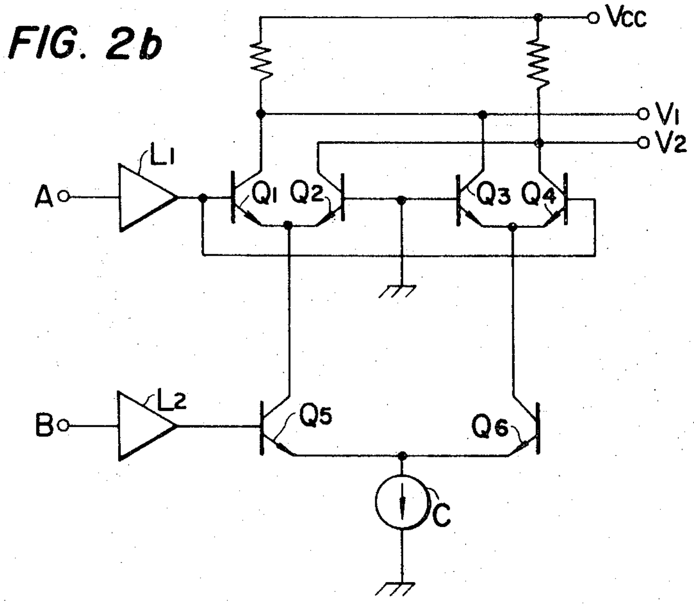
Figure 3:
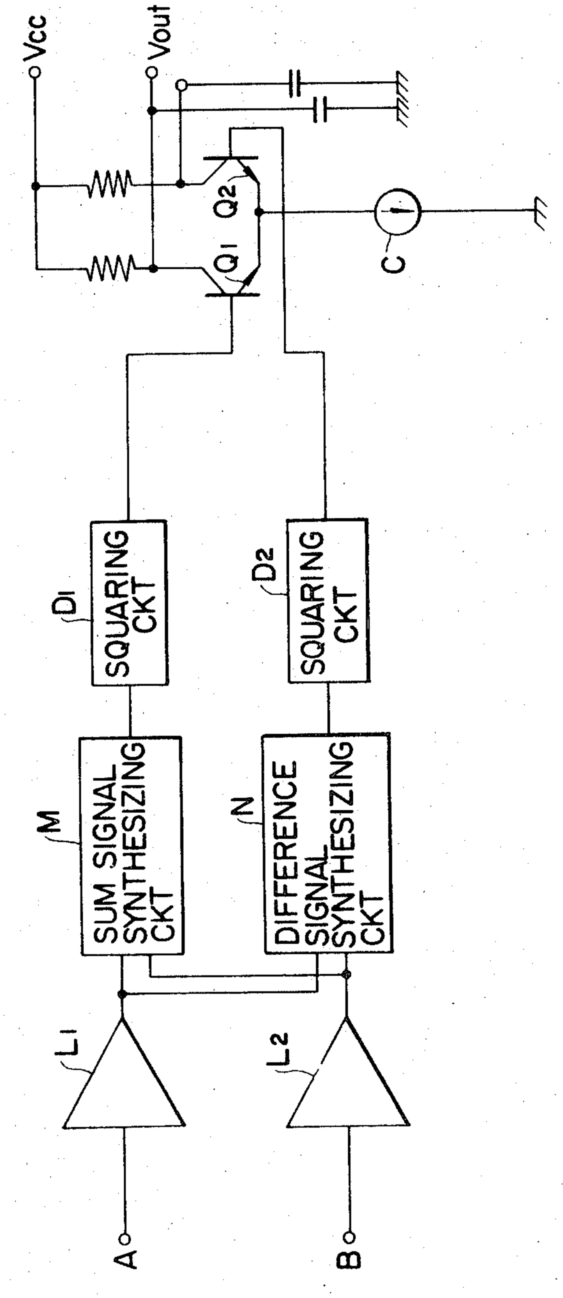
FIG. 3 is a schematic circuit diagram of an embodiment of the phase detector circuit according to the present invention.

FIG. 3 is a diagram of a phase detector circuit, showing an embodiment of the present invention. $L_1$ and $L_2$ denote phase shaping circuits, which are the same as those used in the circuit of FIG. 2*b*. A sum signal synthesizing circuit M receives the outputs of the pulse shaping circuits $L_1$ and $L_2$ as its inputs, and synthesizes the sum signal $(A + B)$ between input signals A and B. A difference signal synthesizing circuit N also receives the outputs of the pulse shaping circuits $L_1$ and $L_2$ as its inputs, and synthesizes the difference signal $(A - B)$. Squaring circuits $D_1$ and $D_2$ receive the sum signal and the difference signal as inputs, and square them, respectively. The squared signals are applied to the base electrodes of transistors $Q_1$ and $Q_2$. The transistors $Q_1$ and $Q_2$ have their emitters connected in common, and constitute a single type differential amplifier stage along with a constant current source C.

The input signals A and B are applied to the respective pulse shaping circuits $L_1$ and $L_2$. The inputs A and B may be either pulse signals or sinusoidal signals. For example, in the case of television, the signal A may be a chromatic signal, while the signal B may be a pulse at a reference oscillation frequency of 3.58 Mc. Otherwise, both the signals A and B may be voice frequency signals. The phase detector circuit converts the input signals into pulses and detects a phase difference between them.

Figures 4A, 4B, 4C, 4D, 4E, 4F, 4G, 4H, 4I, 4J:
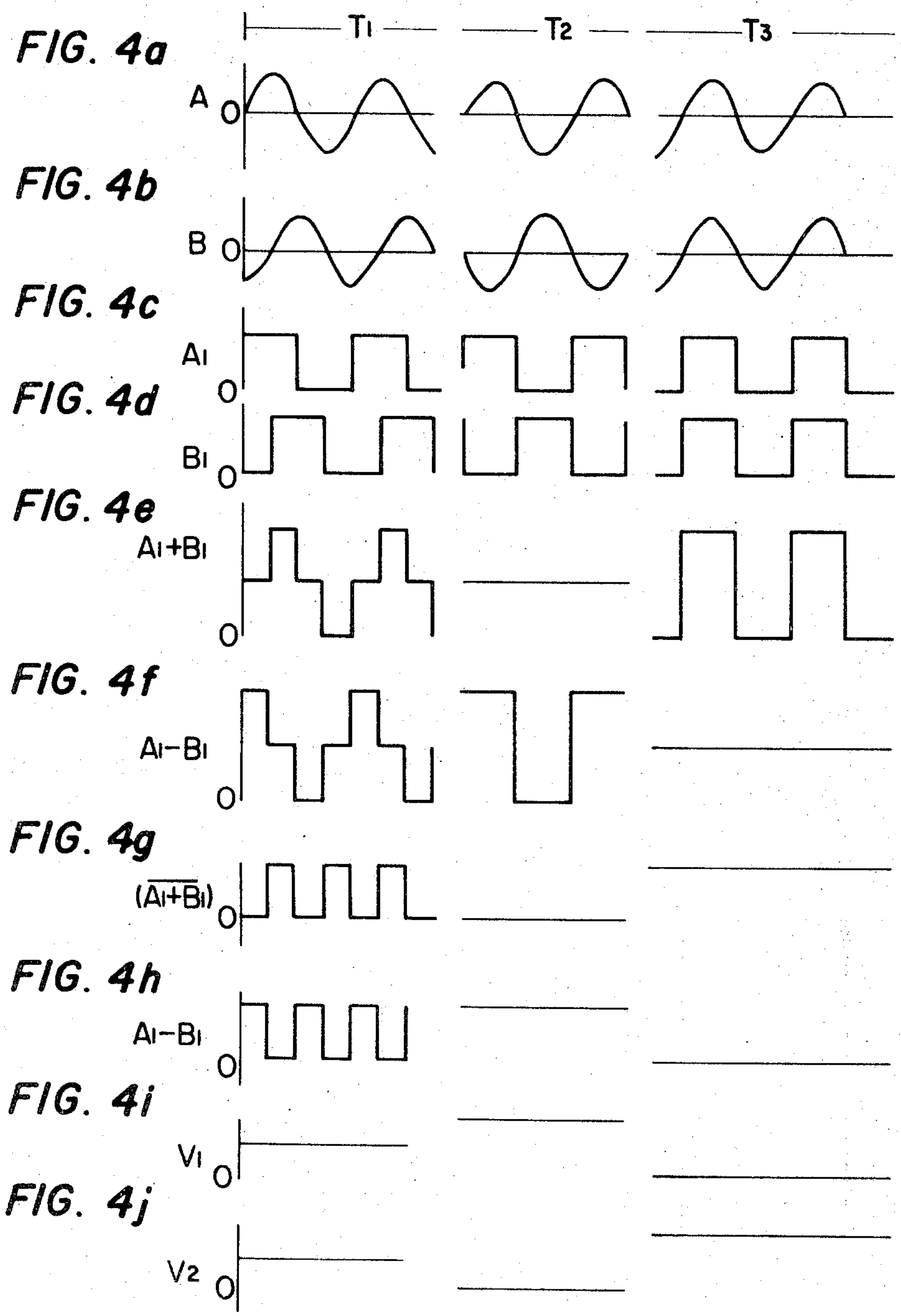
FIGS. 4*a* to 4*j* are waveform diagrams of signals at various parts of the circuit illustrated in FIG. 3.

The operation of the present invention will now be described with reference to FIGS. 4*a* and 4*j*, which illustrate the waveforms of signals applied to the phase detector circuit of FIG. 3 and the waveforms of outputs at various parts of that circuit. In the figures, the period $T_1$ corresponds to the case where the phase difference between signals A and B is 90°; a period $T_2$ identifies the case where that phase difference is 0°; and, the period $T_3$ identifies the case where that phase difference is 180°. FIGS. 4*a* and 4*b* show the signal voltage waveforms of the input signals A and B; FIGS. 4*c* and 4*d* show the output waveforms of the pulse shaping circuits $L_1$ and $L_2$; FIGS. 4*e* and 4*f* show the output waveforms of the sum signal synthesizing circuit M and the difference signal synthesizing circuit N; FIGS. 4*g* and 4*h* show the full-wave rectification waveforms of the respective signals in FIGS. 4*e* and 4*f;* and FIGS. 4*i* and 4*j* show the output waveforms of the phase detector circuit.

Now, when the input signals A and B are applied to the pulse shaping circuits $L_1$ and $L_2$, the sinusoidal wave signals A and B are shaped into pulses of a duty cycle of 50 per cent and converted into pulse signals $A_1$ and $B_1$, respectively. The pulse shaped signals $A_1$ and $B_1$ are fed to the sum signal synthesizing circuit M and the difference signal synthesizing circuit N, to synthesize the sum signal $(A_1 + B_1)$ and the difference signal $(A_1 - B_1)$. The resultant sum signal and difference signal are fed to the squaring circuits $D_1$ and $D_2$, and are squared therein. Thus, squared potentials $(V_A + V_B)^2$ and $(V_A - V_B)^2$, as shown in FIGS. 4*g* and 4*h*, are generated.

The squared potentials vary in dependence on the phase difference of the input signals A and B. The squared potentials are applied to the base electrodes of the transistors $Q_1$ *and* $Q_2$ of the differential amplifier stage, and are subjected to subtraction. Across the output terminals of the differential amplifier stage, only a product $\{(V_A + V_B)^2 - (V_A - V_B)\} = 4\ V_A\ V_B$ appears, and a voltage responsive to the phase difference can be produced. Even if an offset potential difference arises between the outputs of the full-wave rectifier circuits, it can be canceled in such a way that the emitter electrodes of the respective transistors of the differential amplifier stage are connected through resistances and that the ratio of currents flowing through the transistors $Q_1$ and $Q_2$ is changed by varying the ratio of the resistances. The adjustment of the resistance ratio relates only to two resistances, and hence can be made very simply.

Accordingly, in accordance with the present invention, when the phase difference is 90°, the output voltages $V_1$ and $V_2$ become equal, and the dispersion due to the offset potential can be eliminated. When the phase difference is 0° or 180°, the dispersion ascribable to the offset potential can also be prevented, and predetermined output potentials can be obtained.

As stated above, in the phase detector circuit of the present invention, the sum signal and the difference signal are synthesized from the outputs of the pulse shaping circuits, the respective synthesized outputs are subjected to full-wave rectification so as to produce the DC potentials proportional to the phase difference to be detected, and the DC potentials are compared by the differential amplifier stage so as to provide the output voltages corresponding to that phase difference. A single type differential amplifier stage can be employed, so that the cancellation of the offset potential is facilitated. In addition, all the stages can be constructed with direct coupling, so that the phase detector circuit can be effectively formed as an integrated semiconductor circuit device.

What is claimed is:

1. A phase detector circuit comprising a first pulse shaping circuit which receives a first signal as its input, a second pulse shaping circuit which receives a second signal as its input, a sum signal synthesizing circuit connected to the outputs of said first and second pulse shaping circuits, a difference signal synthesizing circuit connected to the outputs of said first and second pulse shaping circuit, first and second squaring circuits connected respectively to the outputs of said sum signal synthesizing circuit and said difference signal synthesizing circuit, and a differential amplifier circuit having first and second differential inputs connected to the respective outputs of said first and second squaring circuits, whereby an output of said differential amplifier circuit varies in correspondence with a phase difference between said first and second input signals.

2. A phase detector circuit for detecting the phase difference between first and second input signals, comprising first means for summing said first and second signals, second means for subtracting said first and second signal, third means connected to the output of said first means for squaring the sum of said first and second signals, fourth means connected to the output of said second means for squaring the difference between said first and second signals, and a differential amplifier having first and second inputs connected to the outputs of said third and fourth means, respectively.

3. A phase detector circuit as defined in claim 2, further including first and second pulse shaping circuits for applying said first and second signals to said first and second means.

* * * * *